(12) United States Patent
Rahman et al.

(10) Patent No.: US 9,130,422 B2
(45) Date of Patent: Sep. 8, 2015

(54) INTERIOR PERMANENT MAGNET MACHINE HAVING A MIXED RARE EARTH MAGNET AND FERRITE MAGNET ROTOR

(71) Applicant: GM GLOBAL TECHNOLOGY OPERATIONS LLC, Detroit, MI (US)

(72) Inventors: Khwaja M. Rahman, Troy, MI (US); Sinisa Jurkovic, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/789,880

(22) Filed: Mar. 8, 2013

(65) Prior Publication Data

US 2014/0252903 A1  Sep. 11, 2014

(51) Int. Cl.
*H02K 1/27* (2006.01)
*H02K 21/12* (2006.01)
*H02K 1/02* (2006.01)
*H02K 21/14* (2006.01)

(52) U.S. Cl.
CPC ............... *H02K 1/274* (2013.01); *H02K 1/02* (2013.01); *H02K 1/2766* (2013.01); *H02K 21/14* (2013.01)

(58) Field of Classification Search
CPC ... H02K 1/2776; H02K 1/276; H02K 1/2773; H02K 2213/03; H02K 1/246
USPC ............ 310/156.53, 156.56, 156.57, 156.54, 310/156.55, 156.01–156.84
See application file for complete search history.

(56) References Cited

U.S. PATENT DOCUMENTS

| | | | | |
|---|---|---|---|---|
| 5,945,760 | A * | 8/1999 | Honda et al. | 310/156.53 |
| 6,177,745 | B1 * | 1/2001 | Narita et al. | 310/156.43 |
| 7,436,095 | B2 * | 10/2008 | Aydin et al. | 310/156.53 |
| 7,504,754 | B2 * | 3/2009 | Jahns et al. | 310/156.53 |
| 7,851,958 | B2 * | 12/2010 | Cai et al. | 310/156.53 |
| 8,664,823 | B2 * | 3/2014 | Vyas et al. | 310/156.53 |
| 2003/0102755 | A1 * | 6/2003 | Naito et al. | 310/156.39 |
| 2007/0159021 | A1 * | 7/2007 | Horst | 310/156.53 |
| 2010/0141076 | A1 * | 6/2010 | Blissenbach et al. | 310/156.53 |
| 2010/0237735 | A1 * | 9/2010 | Blissenbach et al. | 310/156.53 |

* cited by examiner

*Primary Examiner* — Dang Le
*Assistant Examiner* — Leda Pham
(74) *Attorney, Agent, or Firm* — Quinn Law Group, PLLC

(57) ABSTRACT

A rotor core for an internal permanent magnet machine includes at least one ferrite pole and at least one rare earth pole, arranged radially about an axis in alternating relationship. The ferrite poles define a plurality of first pole cavities, and the rare earth poles define a plurality of second pole cavities. One of a plurality of ferrite magnets is disposed within each of the first pole cavities of the ferrite poles, and one of a plurality of rare earth magnets is disposed within each of the second pole cavities of the rare earth poles.

12 Claims, 2 Drawing Sheets

INTERIOR PERMANENT MAGNET MACHINE HAVING A MIXED RARE EARTH MAGNET AND FERRITE MAGNET ROTOR

TECHNICAL FIELD

The invention generally relates to an internal permanent magnet machine, and more particularly to a rotor assembly for the internal permanent magnet machine.

BACKGROUND

Interior Permanent Magnet (IPM) machines include a rotor having a plurality of magnets of alternating polarity disposed around an outer periphery of the rotor. The rotor is rotatable within a stator which includes a plurality of windings. The rotor magnetically interacts with the stator to generate rotation of the rotor about an axis of rotation. An IPM machine may use either ferrite magnets or rare earth magnets, such as NdFeB, in the rotor. Ferrite magnets are less expensive, but produce a lower performance compared to the rare earth magnets when utilized in identically configured IPM machines.

SUMMARY

An interior permanent magnet machine includes a wound stator, and a rotor core. The rotor core includes a ferrite pole and a rare earth pole. The ferrite pole defines a plurality of first pole cavities, and the rare earth pole defines a plurality of second pole cavities. The rotor core magnetically interacts with the wound stator for rotation about a central axis of rotation. The interior permanent magnet machine further includes a plurality of ferrite magnets and a plurality of rare earth magnets. One of the plurality of ferrite magnets is disposed within each of the first pole cavities of the ferrite pole, and one of the plurality of rare earth magnets is disposed within each of the second pole cavities of the rare earth pole.

A rotor assembly for an internal permanent magnet machine is also provided. The rotor assembly includes a rotor core concentrically disposed about a central axis of rotation. The rotor core includes a plurality of ferrite poles and a plurality of rare earth poles. Each of the plurality of ferrite poles defines a plurality of first pole cavities, and each of the plurality of rare earth poles defines a plurality of second pole cavities. The rotor assembly further includes a plurality of ferrite magnets and a plurality of rare earth magnets. One of the plurality of ferrite magnets is disposed within each of the first pole cavities of the ferrite pole, and one of the plurality of rare earth magnets is disposed within each of the second pole cavities of the rare earth pole. The plurality of ferrite magnets of the ferrite pole are arranged in a plurality of rows radially spaced from each relative to the central axis of rotation. Each of the plurality of first pole cavities and the plurality of ferrite magnets in the ferrite pole include a cross section perpendicular to the central axis of rotation that defines an arcuate shape having an arc center. The arc centers of each of the plurality of ferrite magnets of the ferrite pole are concentrically located relative to each other. Each of the plurality of rare earth magnets of the rare earth pole includes a cross section perpendicular to the central axis of rotation that defines a rectangular shape. The plurality of rare earth magnets of the rare earth pole are arranged in a plurality of layers. Each layer of the rare earth magnets of the rare earth pole defines a concave V-shape perpendicular to the central axis of rotation.

Accordingly, the rotor assembly includes both ferrite magnets and rare earth magnets, arranged in alternating poles in a configuration that is specifically designed to minimize the volume of rare earth magnets, while substantially maintaining the performance of an equivalent all rare earth magnet rotor assembly. Minimizing the volume of the rare earth magnets used in the rotor assembly, reduces the cost of manufacturing the rotor assembly when compared to an all rare earth magnet rotor assembly, with no significant loss in performance.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, an Interior Permanent Magnet machine is generally shown at 20. The IPM machine 20 may include, but is not limited to an electric motor or other similar device.

Figure 1:
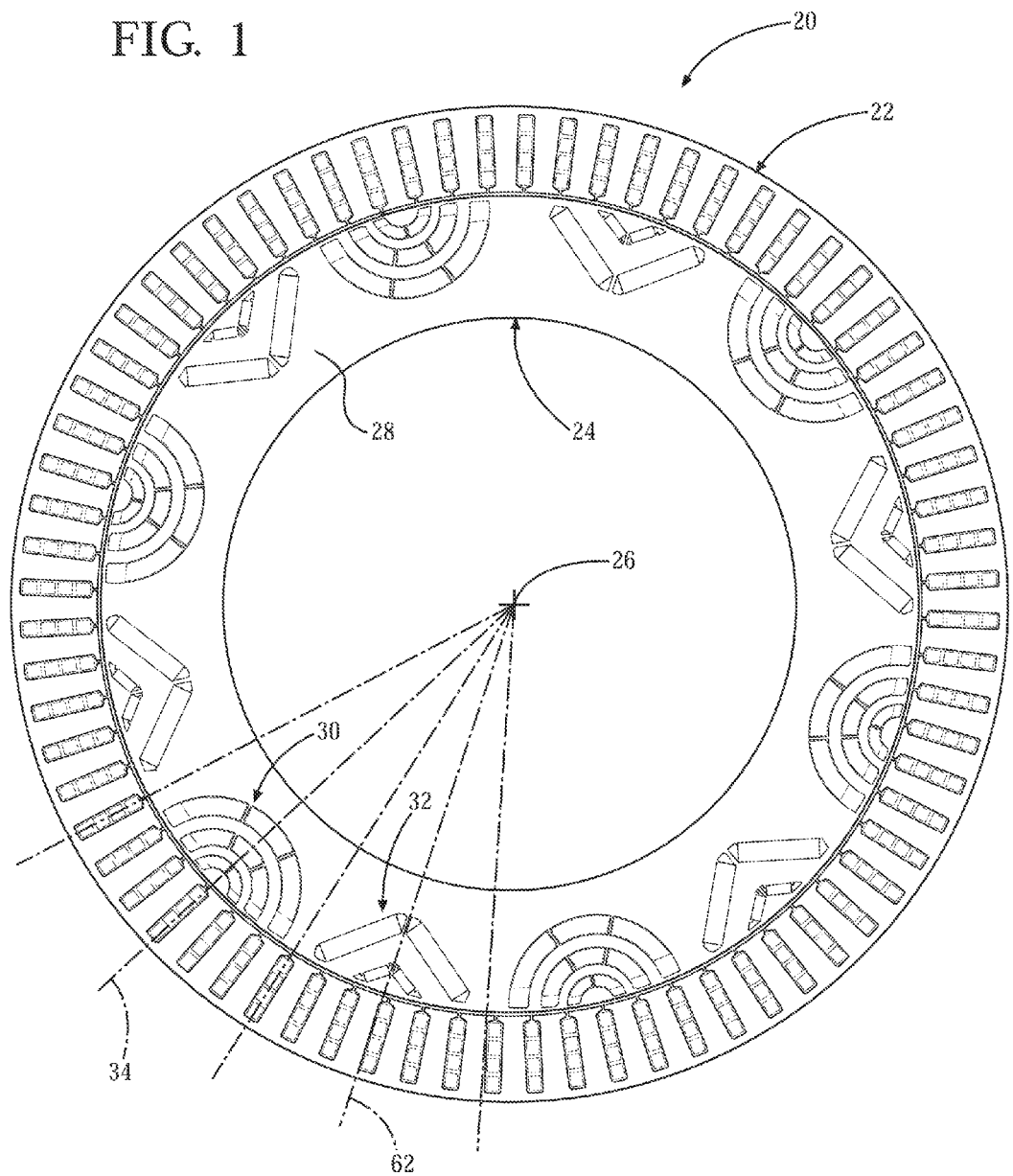
FIG. 1 is a schematic cross sectional view of an internal permanent magnet machine.

Referring to FIG. 1, the IPM machine 20 includes a wound stator 22 and a rotor assembly 24. The rotor assembly 24 magnetically interacts with the wound stator 22 to rotate relative to the wound stator 22 about a central axis of rotation 26. The rotor assembly 24 includes a rotor core 28. The central axis of rotation 26 is disposed at a center of the rotor core 28. The rotor core 28 includes at least one ferrite pole 30 and at least one rare earth pole 32. Preferably, the rotor assembly 24 includes a plurality of ferrite poles 30 and a plurality of rare earth poles 32. The number of the ferrite poles 30 is equal to the number of the rare earth poles 32. The ferrite poles 30 and the rare earth poles 32 are arranged radially about the central axis of rotation 26 in an alternating relationship. When the rotor assembly 24 includes a plurality of ferrite poles 30 and a plurality of rare earth poles 32, each ferrite pole 30 is circumferentially disposed between two rare earth poles 32, and each rare earth pole 32 is circumferentially disposed between two ferrite poles 30. FIG. 1 represents an IPM machine 20 having 12 total poles, including 6 ferrite poles 30 and 6 rare earth poles 32. However, it should be appreciated that the total number of poles of the IPM machine 20 may vary from the exemplary embodiment shown in FIG. 1.

Figure 2:
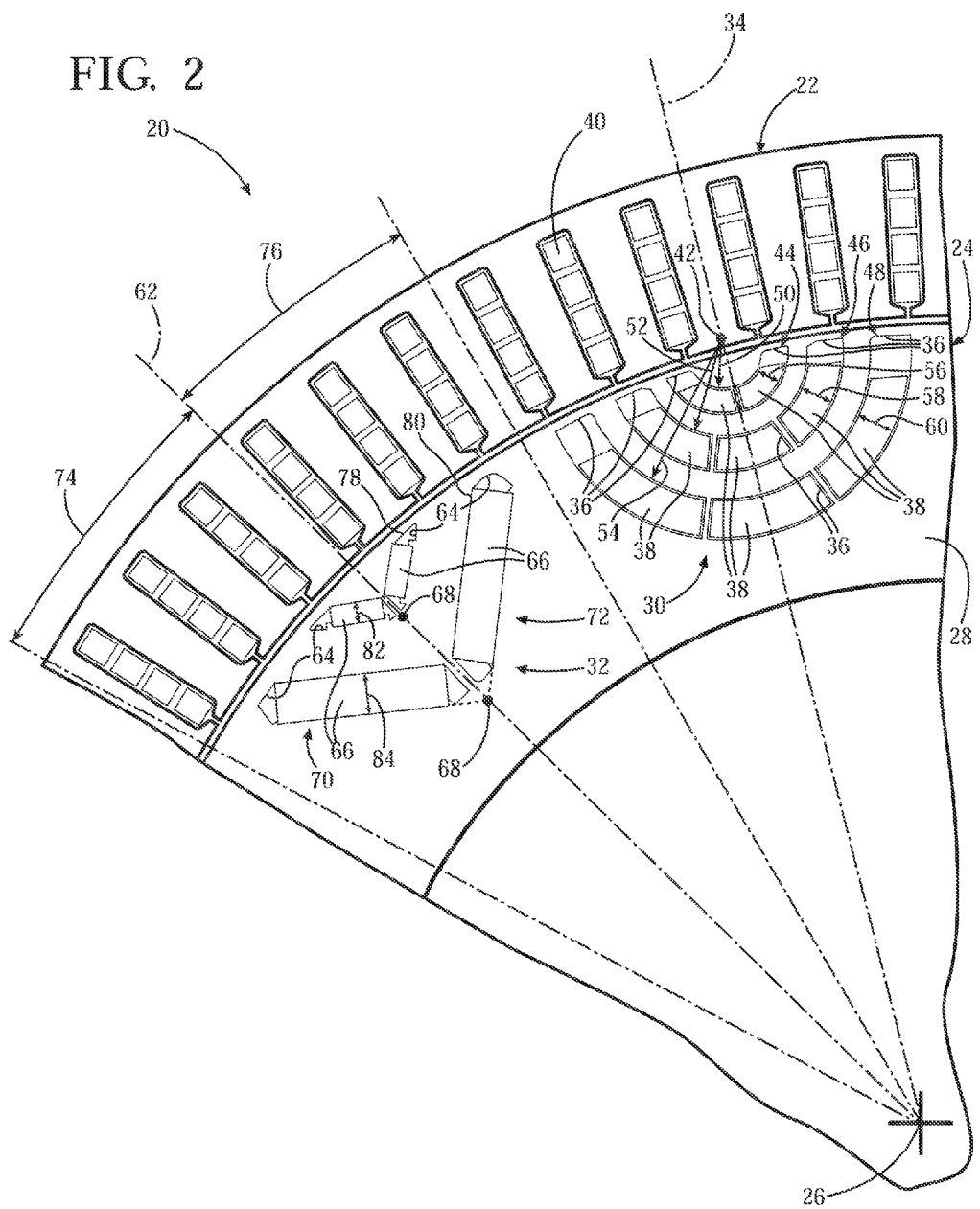
FIG. 2 is an enlarged schematic fragmentary cross sectional view of the internal permanent magnet machine.

Referring to FIG. 2, each of the ferrite poles 30 includes a first pole axis 34 that extends radially outward from the central axis of rotation 26 through a center of each respective ferrite pole 30. Each of the ferrite poles 30 defines a plurality of first pole cavities 36.

Each ferrite pole 30 includes an equal number of first pole cavities 36 therein, arranged in an identical orientation. The first pole cavities 36 extend three-dimensionally into the rotor core 28. The first pole cavities 36 may include cutouts, slots, etc. The rotor assembly 24 further includes a plurality of ferrite magnets 38, with one of the plurality of ferrite magnets 38 disposed within each of the first pole cavities 36. It should be appreciated that the ferrite magnets 38 and the first pole cavities 36 include substantially corresponding cross sectional shapes perpendicular to the central axis of rotation 26. The ferrite magnets 38 may completely fill the first pole cavities 36, or may leave one or more air gaps between each of the ferrite magnets 38 and their respective first pole cavity. The wound stator 22 includes a plurality of windings 40 that magnetically interact with the ferrite magnets 38 disposed within the first pole cavities 36 of the ferrite poles 30 to generate torque, and cause rotation of the rotor core 28 about the central axis of rotation 26 relative to the wound stator 22.

The shape and orientation of the ferrite magnets 38 and the first pole cavities 36 is described in detail below with reference to FIG. 2. While the description provided herein is limited to only a single ferrite pole 30 shown in FIG. 2, it should be appreciated that the shape and orientation of the ferrite magnets 38 and their respective first pole cavities 36 are identical to the orientation described herein with reference to the single ferrite pole 30 shown in FIG. 2.

Each of the first pole cavities 36 and their respective ferrite magnets 38 disposed therein includes a cross section perpendicular to the central axis of rotation 26 that defines an arcuate shape having an arc center. The magnets of the each ferrite pole 30 are preferably arranged symmetrically about their respective first pole axis 34, such that the arc centers of each of the ferrite magnets 38 of each ferrite pole 30 are concentric with each other, i.e., each arc center of each ferrite magnet 38 of each ferrite pole 30 share a common radial center location 42.

The first pole cavities 36 of each ferrite pole 30 are arranged in one or more rows that are radially spaced relative to the central axis of rotation 26. Each row is radially spaced from the other rows. As shown in the Figures, the first pole cavities 36 of each ferrite pole 30 define three rows, i.e. a first row 44 or radially outermost row relative to the central axis of rotation 26, a second row 46 or radially middle row, and a third row 48 or radially innermost row relative to the axis of rotation 26. Accordingly, the third row 48 is spaced nearer the central axis of rotation 26 than the second row 46, and the second row 46 is spaced nearer the central axis of rotation 26 than the first row 44. It should be appreciated that the first pole cavities 36 of each ferrite pole 30 may define only a single row, or may define more than the three rows shown. Furthermore, each row may include any number of first pole cavities 36 therein. As shown, the first row 44 includes two first pole cavities 36, the second row 46 includes three first pole cavities 36, and the third row 48 includes three first pole cavities 36. However, the number of first pole cavities 36 in each row may differ from the exemplary embodiment shown.

Each ferrite magnet 38 of the first row 44 includes a first radius 50, each ferrite magnet 38 of the second row 46 includes a second radius 52, and each ferrite magnet 38 of the third row 48 includes a third radius 54. The third radius 54 is greater than the second radius 52, and the second radius 52 is greater than the first radius 50. Preferably, the first radius 50, the second radius 52 and the third radius 54 each include a value between the range of 8 mm and 25 mm. However, it should be appreciated that the value of the first radius 50, the second radius 52 and the third radius 54 may differ from the exemplary range provided herein.

Each layer of the ferrite magnets 38 of each ferrite pole 30 includes a thickness. As shown in FIG. 2, the first row 44 of the ferrite magnets 38 include a first thickness 56, the second row 46 of the ferrite magnets 38 include a second thickness 58, and the third row 48 of the ferrite magnets 38 include a third thickness 60. Accordingly, each ferrite magnet 38 in each row includes the same thickness, but the thickness of the ferrite magnets 38 in each different row may be different. As shown, the thickness of the ferrite magnets 38 in each row of the ferrite magnets 38 decreases with an increase in the radial distance from the central axis of rotation 26. Accordingly, the first thickness 56 of the first row 44 of the ferrite magnets 38 is smaller than the second thickness 58 of the second row 46 of the ferrite magnets 38, and the second thickness 58 of the second row 46 of the ferrite magnets 38 is smaller than the third thickness 60 of the third row 48 of the ferrite magnets 38. Preferably, the first thickness 56 for the first row 44 of the ferrite magnets 38, the second thickness 58 of the second row 46 of the ferrite magnets 38, and the third thickness 60 of the third row 48 of the ferrite magnets 38 is between the range of 2 mm and 5 mm. However, it should be appreciated that the value of the first thickness 56, the second thickness 58 and the third thickness 60 may differ from the exemplary range provided herein.

Each of the rare earth poles 32 includes a second pole axis 62 that extends radially outward from the central axis of rotation 26 through a center of each respective rare earth pole 32. Each of the rare earth poles 32 defines a plurality of second pole cavities 64.

Each rare earth pole 32 includes an equal number of second pole cavities 64 therein, arranged in an identical orientation. The second pole cavities 64 extend three-dimensionally into the rotor core 28. The second pole cavities 64 may include cutouts, slots, etc. The rotor assembly 24 further includes a plurality of rare earth magnets 66, with one of the rare earth magnets 66 disposed within each of the second pole cavities 64. It should be appreciated that the rare earth magnets 66 and the second pole cavities 64 include substantially corresponding cross sectional shapes perpendicular to the central axis of rotation 26. The rare earth magnets 66 may completely fill the second pole cavities 64, or may leave one or more air gaps between the rare earth magnets 66 and the respective second pole cavities 64. The windings 40 of the wound stator 22 magnetically interact with the rare earth magnets 66 disposed within the second pole cavities 64 of the rare earth poles 32 to generate torque, and cause rotation of the rotor core 28 about the central axis of rotation 26 relative to the wound stator 22.

The rare earth magnets 66 may include any type of rare earth magnetic material suitable for use in the IPM machine 20. For example, each of the rare earth magnets 66 may be manufactured from and include, but are not limited to, Neodymium iron boron (NdFeB). The flux of the strong rare earth magnets 66 from one of the rare earth poles 32 enhances the flux of the ferrite magnets 38 of the circumferentially adjacent ferrite poles 30, thereby lowering the demagnetization potential of the ferrite magnets 38 in the adjacent ferrite poles 30.

The shape and orientation of the rare earth magnets 66 and the second pole cavities 64 is described in detail below with reference to FIG. 2. While the description provided herein is limited to only a single rare earth pole 32 shown in FIG. 2, it should be appreciated that the shape and orientation of the rare earth magnets 66 and their respective second pole cavities 64 are identical to the orientation described herein with reference to the single rare earth pole 32 shown in FIG. 2.

Referring to FIG. 2, each of the second pole cavities 64 and their respective rare earth magnets 66 disposed therein includes a cross section perpendicular to the central axis of rotation 26 that defines a rectangular shape. The rare earth magnets 66 of each of the rare earth poles 32 are arranged in at least one layer defining a concave V-shape perpendicular to the central axis of rotation 26 with an apex 68 of the concave V-shape disposed on the second pole axis 62.

The rare earth magnets 66 of each of the rare earth poles 32 are preferably arranged symmetrically about the second pole axis 62 of each respective rare earth pole 32. The rare earth magnets 66 of each of the rare earth poles 32 is arranged to define a first group 70 of the rare earth magnets 66 and a second group 72 of the rare earth magnets 66. The first group 70 of the rare earth magnets 66 is disposed on a first side 74 of the second pole axis 62, and the second group 72 of the rare earth magnets 66 is disposed on a second side 76 of the second pole axis 62. The first group 70 of the rare earth magnets 66 and the second group 72 of rare earth magnets 66 are preferably mirror images of each other across the second pole axis 62. Each of the rare earth magnets 66 of the first group 70 is completely disposed on the first side 74 of the second pole axis 62. Similarly, each of the rare earth magnets 66 of the second group 72 is completely disposed on the second side 76 of the second pole axis 62.

As noted above, the second pole cavities 64 of the rare earth poles 32 are arranged in one or more layers. If the second pole cavities 64 of each rare earth pole 32 are arranged in multiple layers, then the layers are radially spaced from each other relative to the central axis of rotation 26. As shown in the Figures, the second pole cavities 64 of each rare earth pole 32 are arranged to define two layers, i.e. a first layer 78 or radially outermost layer relative to the central axis of rotation 26, and a second layer 80 or radially innermost layer relative to the central axis of rotation 26. Accordingly, the first layer 78 is disposed radially farther from the central axis of rotation 26 than the second layer 80. It should be appreciated that the second pole cavities 64 may define only a single layer, or may define more than the two layers shown. Furthermore, each layer may include any number of second pole cavities 64 therein. As shown, the first layer 78 includes two second pole cavities 64, and the second layer 80 includes two second pole cavities 64. However, the number of second pole cavities 64 in each layer of each rare earth pole 32 may differ from the exemplary embodiment shown.

Each layer of the rare earth magnets 66 of each rare earth pole 32 includes a thickness. As shown in FIG. 2, the first layer 78 includes a first thickness 82, and the second layer 80 includes a second thickness 84. Accordingly, each magnet in each layer includes the same thickness. The thickness of the magnets in each layer is different. As shown, the thickness of the magnets in each layer of magnets decreases with an increase in the radial distance from the central axis of rotation 26. Accordingly, the first thickness 82 of the first layer 78 of magnets is less than the second thickness 84 of the second layer 80 of magnets. Preferably, the first thickness 82 for the first layer 78 of the rare earth magnets 66 and the second thickness 84 of the second layer 80 of the rare earth magnets 66 is between the range of 2 mm and 5 mm. However, it should be appreciated that the value of the first thickness 82 of the rare earth magnets 66 and the second thickness 84 of the rare earth magnets 66 may differ from the exemplary range provided herein.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An interior permanent magnet machine comprising:
    a wound stator;
    a rotor core including at least one ferrite pole defining a plurality of first pole cavities, and at least one rare earth pole defining a plurality of second pole cavities, wherein the rotor core magnetically interacts with the wound stator for rotation about a central axis of rotation;
    a plurality of ferrite magnets, with one of the plurality of ferrite magnets disposed within each of the first pole cavities of the at least one ferrite pole; and
    a plurality of rare earth magnets, with one of the plurality of rare earth magnets disposed within each of the second pole cavities of the at least one rare earth pole;
    wherein the plurality of ferrite magnets of the at least one ferrite pole are arranged in at least a first row, a second row, and a third row radially spaced from each other relative to the central axis of rotation, with the third row spaced nearer the central axis of rotation than the second row, and the second row spaced nearer the central axis of rotation than the first row;
    wherein all of the ferrite magnets in the first row have a first thickness, all of the ferrite magnets in the second row have a second thickness, and all of the ferrite magnets in the third row have a third thickness, with the first thickness being less than the second thickness, and the second thickness being less than the third thickness;
    wherein the plurality of rare earth magnets of the at least one rare earth pole are arranged in at least a first layer and a second layer, wherein a cross sectional shape perpendicular to the central axis of rotation of each of the first layer and the second layer defines a concave V-shape having an apex of the concave V-shape disposed on a second pole axis, and with the first layer disposed radially farther from the central axis of rotation than the second layer;
    wherein the rare earth magnets of the first layer include a first thickness and the rare earth magnets of the second layer include a second thickness, with the first thickness less than the second thickness; and
    wherein the rare earth magnets of the at least one rare earth pole are arranged about the second pole axis to define a first group of the rare earth magnets that are entirely disposed on a first side of the second pole axis, and a second group of the rare earth magnets that are entirely disposed on a second side of the second pole axis, such that all of the rare earth magnets of the at least one rare earth pole are disposed in either the first group or the second group of rare earth magnets, with none of the rare earth magnets extending across the second pole axis.

2. An interior permanent magnet machine as set forth in claim 1 wherein the rotor core includes a plurality of ferrite poles and a plurality of rare earth poles.

3. An interior permanent magnet machine as set forth in claim 2 wherein the number of the plurality of ferrite poles is equal to the number of the plurality of rare earth poles.

4. An interior permanent magnet machine as set forth in claim 3 wherein the plurality of ferrite poles and the plurality of rare earth poles are arranged radially about the central axis of rotation in an alternating relationship.

5. An interior permanent magnet machine as set forth in claim 1 wherein the plurality of rare earth magnets include neodymium magnets.

6. An interior permanent magnet machine as set forth in claim 1 wherein each of the plurality of ferrite magnets in the ferrite pole include a cross section perpendicular to the central axis of rotation defining an arcuate shape having an arc center.

7. An interior permanent magnet machine as set forth in claim 6 wherein the arc centers of each of the plurality of ferrite magnets of the ferrite pole are concentric with each other.

8. An interior permanent magnet machine as set forth in claim 1 wherein each of the plurality of rare earth magnets of the at least one rare earth pole include a cross section perpendicular to the central axis of rotation defining a rectangular shape.

9. An interior permanent magnet machine as set forth in claim 1 wherein the first group of the rare earth magnets and the second group of the rare earth magnets are mirror images of each other across the second pole axis.

10. A rotor assembly for an internal permanent magnet machine, the rotor assembly comprising:
 a rotor core concentrically disposed about a central axis of rotation and including a plurality of ferrite poles and a plurality of rare earth poles, with each of the plurality of ferrite poles defining a plurality of first pole cavities and each of the plurality of rare earth poles defining a plurality of second pole cavities;
 a plurality of ferrite magnets, with one of the plurality of ferrite magnets disposed within each of the first pole cavities of the ferrite pole;
 wherein the plurality of ferrite magnets of the ferrite pole are arranged in a plurality of rows radially spaced from each other relative to the central axis of rotation;
 wherein each of the plurality of first pole cavities and the plurality of ferrite magnets in the ferrite pole define an arcuate shape having an arc center when viewed in a cross section perpendicular to the central axis of rotation, with the arc centers of each of the plurality of ferrite magnets of the ferrite pole concentrically located relative to each other;
 wherein all of the ferrite magnets in each row of ferrite magnets have an identical thickness, and with the thickness of the ferrite magnets of each row decreasing with an increase in radial distance from the central axis of rotation;
 a plurality of rare earth magnets, with one of the plurality of rare earth magnets disposed within each of the second pole cavities of the rare earth pole;
 wherein each of the plurality of rare earth magnets of the rare earth pole defining a rectangular shape when viewed in a cross section perpendicular to the central axis of rotation; and
 wherein the plurality of rare earth magnets of the rare earth pole are arranged in a plurality of layers, wherein a cross sectional shape perpendicular to the central axis of rotation of each of the plurality of layers of the rare earth magnets of the rare earth pole defines a concave V-shape having an apex of the concave V-shape disposed on a second pole axis;
 wherein the plurality of layers of the rare earth magnets of the at least one rare earth pole includes at least a first layer and a second layer, with the first layer disposed radially farther from the central axis of rotation than the second layer;
 wherein the rare earth magnets of the first layer include a first thickness and the rare earth magnets of the second layer include a second thickness, with the first thickness less than the second thickness; and
 wherein the rare earth magnets of the at least one rare earth pole are arranged about the second pole axis to define a first group of the rare earth magnets that are entirely disposed on a first side of the second pole axis, and a second group of the rare earth magnets that are entirely disposed on a second side of the second pole axis, such that all of the rare earth magnets of the at least one rare earth pole are disposed in either the first group or the second group of rare earth magnets, with none of the rare earth magnets extending across the second pole axis.

11. A rotor assembly as set forth in claim 10 wherein the number of the plurality of ferrite poles is equal to the number of the plurality of rare earth poles.

12. A rotor assembly as set forth in claim 11 wherein the plurality of ferrite poles and the plurality of rare earth poles are arranged radially about the central axis of rotation in an alternating relationship.

* * * * *